United States Patent [19]

Porcelli

[11] Patent Number: 4,618,055

[45] Date of Patent: Oct. 21, 1986

[54] COLLATOR SECTION OF LASAGNA PACKER

[75] Inventor: Michele L. Porcelli, Palmyra, Pa.

[73] Assignee: Hershey Foods Corporation, Hershey, Pa.

[21] Appl. No.: 694,511

[22] Filed: Jan. 24, 1985

[51] Int. Cl.$^4$ .................................................. B65G 47/26
[52] U.S. Cl. ................................. 198/422; 198/860.4; 198/950; 414/46; 271/184; 271/225
[58] Field of Search ............... 198/422, 429, 430, 433, 198/860.4, 950, 463.4; 414/28, 46; 271/184, 225

[56] References Cited

U.S. PATENT DOCUMENTS

| | | | |
|---|---|---|---|
| 2,470,795 | 5/1949 | Socke | 198/429 |
| 2,959,270 | 11/1960 | Heaton et al. | 198/429 |
| 3,410,052 | 11/1968 | Johnson et al. | 198/429 |
| 4,399,905 | 8/1983 | Lance et al. | 198/422 |
| 4,523,671 | 6/1985 | Campbell | 198/422 |

Primary Examiner—Joseph E. Valenza
Attorney, Agent, or Firm—Paul & Paul

[57] ABSTRACT

In a commercial lasagna making and packaging machine, a collator comprises a vertically movable conveyor having shelves positioned to receive strips of lasagna delivered thereto by a horizontally moving main conveyor which carries the strips of lasagna from the dryer through the cutters to the collator. A counter counts the number of lasagna strips delivered to the collator conveyor. When the desired number of strips have been counted, a push plate pushes a stack of lasagna strips into the receiving section of a narrow belt bulk conveyor for transport to the packaging station. First retaining means are then moved to closed position to retain opposite ends of the lasagna stacks on each side of the push plate. Following withdrawal of the push plate, second retaining means are moved to close the opening created by the withdrawal of the push plate.

16 Claims, 8 Drawing Figures

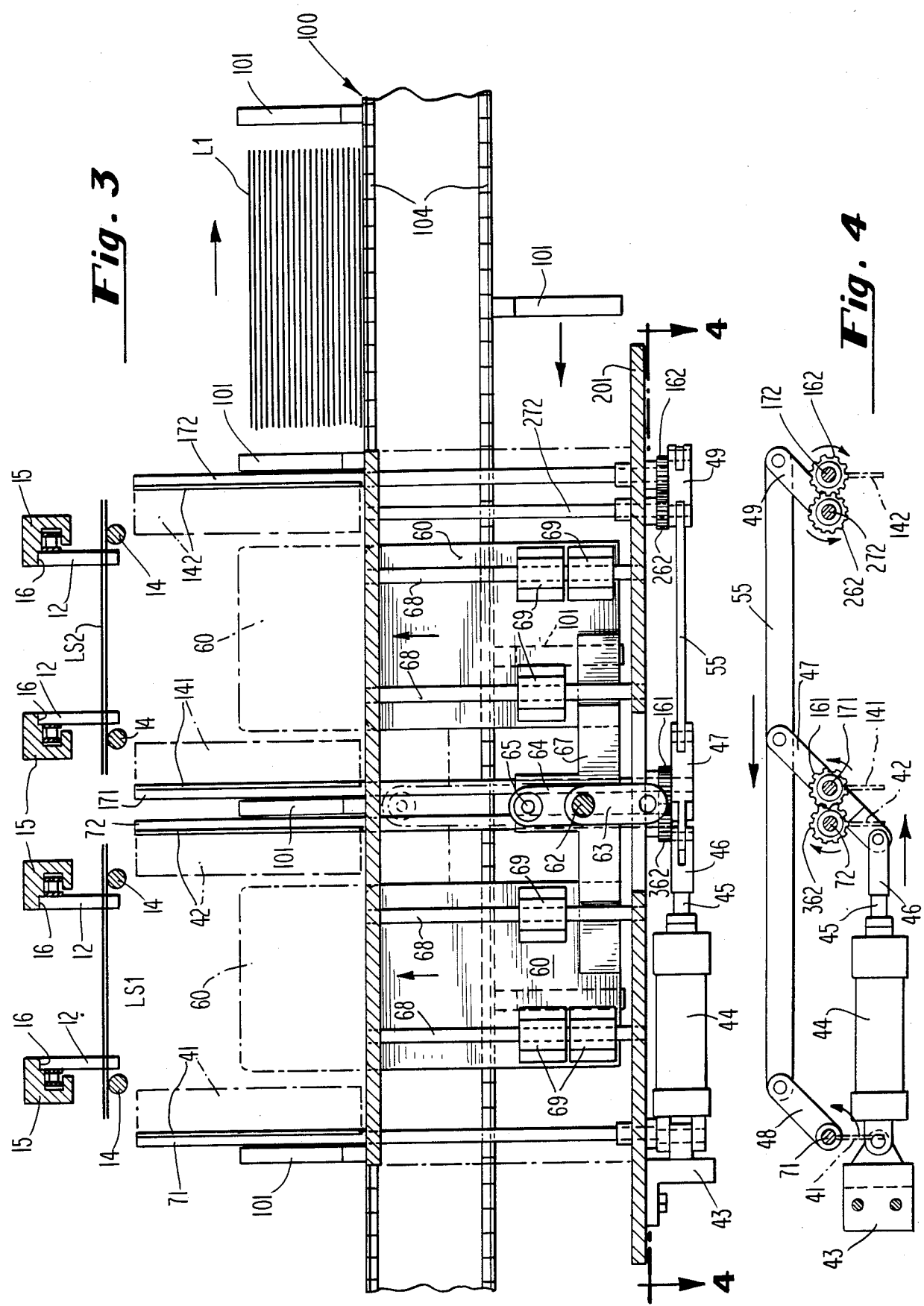

COLLATOR SECTION OF LASAGNA PACKER

BACKGROUND OF THE INVENTION

This invention relates to apparatus for commercial production, assembling, and packaging of lasagna strips.

The invention to which the present application is directed relates particularly to the collator section in which cut strips of lasagna are collated for final packaging.

Apparatus has been available in the prior art for commercial production of lasagna strips but the collating or stacking of the strips for final packaging has heretofore been performed mannually.

In the commercial production of lasagne, a flour-and-water mix is extruded through dies to form continuous strips of pasta approximately two inches wide. The pasta strips are cut into lengths of approximately four feet and hung over horizontally-disposed rods known as stick feeders. A number of strips, for example, twenty-four strips, are hung or suspended over a single stick feeder, with each of the U-shaped strips having legs of about equal length, i.e. about two-feet long. The stick feeders, of which there are many, are moved in succession at a slow rate along a serpentine path through a long dryer. The time of passage through a dryer may be of the order of forty-eight hours. At the exit end of the dryer, each stick feeder is successively lowered through a forwardly-projecting arcuate path and the group of twenty-four suspended strips of lasagna are laid as a group horizontally across a transverse conveyor. The stick feeder is withdrawn horizontally through the open end of the U-shaped strips, and the strips of lasagna are transported forwardly toward a pair of spaced-apart disc cutters. One disc cutter successively severs the closed end of the U-shaped strips, while at the same time the other successively severs the strips at their mid-point. As a result, each of the U-shaped lasagna strips is converted into two sets of two-layer lasagna strips positioned side-by-side on the conveyor. As the conveyor moves on, the sets are cammed apart by a camming separator. In the prior art mechanism, the conveyor then transports the spaced-apart sets of two-layer lasagna strips toward a manual station where operators collect and stack the strips for packaging.

SUMMARY OF THE PRESENT INVENTION

A principal object of the present invention is to provide, in an automatic commercial lasagna-making machine, a collator mechanism for automatically collating or stacking the lasagna strips for final packaging.

A main conveyor is divided into a succession of flights by a succession of upstanding push fingers. The main conveyor conducts a succession of spaced-apart sets of two-layer lasagna strips to a collator mechanism which receives and counts the strips and forms them into two stacks of desired size positioned side-by-side at spaced separation. The mechanisms then automatically pushes the side-by-side stacks into receiving sections of a narrow belt bulk conveyor which transports the lasagna stacks sequentially to a packaging position where the stacks are placed automatically within cartons.

The present application is directed to the collator mechanism described briefly above.

A separate application is being filed, assigned to the assignee of the present application, directed to an improved mechanism positioned at the exit end of the dryer for receiving the group of twenty-four U-shaped strips of lasagna as they are laid as a group horizontally across the main conveyor by the stick feeder. In prior art mechanisms, considerable difficulty has been experienced in maintaining parallel orientation of the strips on the conveyor as they move toward the disc cutters.

BRIEF DESCRIPTION OF THE DRAWING

FIG. 3 is an elevational view looking in along the line 3—3 of FIG. 1.

FIG. 4 is a view looking down along the line 4—4 of FIG. 3.

DETAILED DESCRIPTION OF THE PREFERRED EMBODIMENTS

Reference is first made to FIGS. 5A through 5D which illustrate diagrammatically the sequence of steps which take place during delivery of the stacks of lasagna from the collator into the receiving sections R1 and R2 of the bulk conveyor 100 for transport to the final packaging station.

Figure 5A:
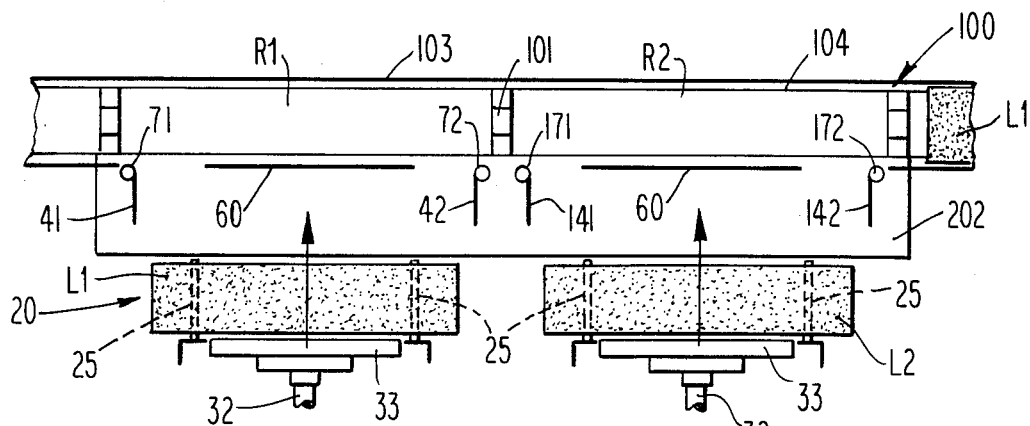
FIGS. 5A, 5B, 5C, and 5D, are sequential diagramatic illustrations showing the manner in which the two sets of stacked lasagna strips are pushed forwardly from the collator into the bulk conveyor for transport to the final packaging station.

In FIG. 5A, pairs of lasagna strips are supported on shelf fingers 25 of two collator conveyors 20 positioned side-by-side. Each of the collator conveyors 20 may, for example, hold a vertical column of nine pairs of lasagna strips, a total of eighteen strips. Liftable retainer gates 60 are positioned in front of the receiving sections R1, R2 of bulk conveyor 100. Two sets of pivotal retainer shutters 41, 42 and 141, 142 are shown, one set for each of the receiving sections R1, R2. In FIG. 5A, each shutter is in open or receiving position, and gates 60 are DOWN. Thus, the receiving sections R1, R2 of the bulk conveyor 100 are ready to receive the two stacks of lasagna L1, L2.

Figure 5B:
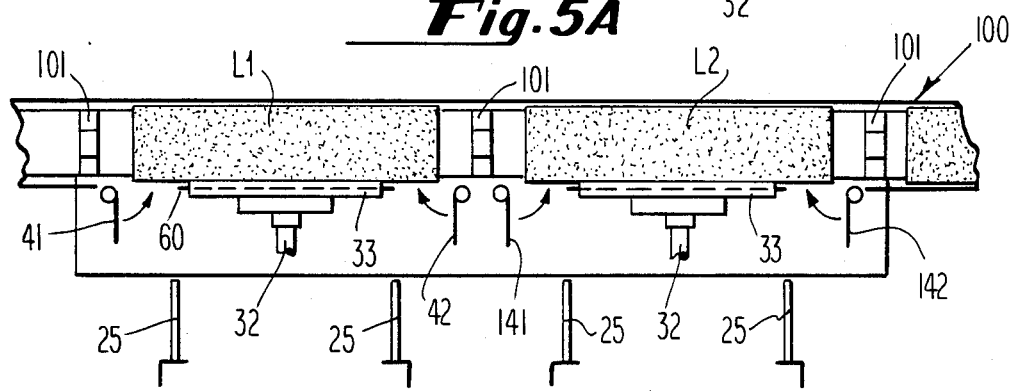

In FIG. 5B, the push plates 33 have been extended by the pistons 32 and the pairs of lasagna strips have been pushed forwardly from the shelf fingers 25 into the receiving sections R1, R2 of the bulk conveyor 100, forming two stacks L1, L2. In FIG. 5B, the vertically-movable gates 60 are still in their lowered or DOWN positions and the retaining shutters 41, 42 and 141, 142 are still in their open positions.

Figure 5C:
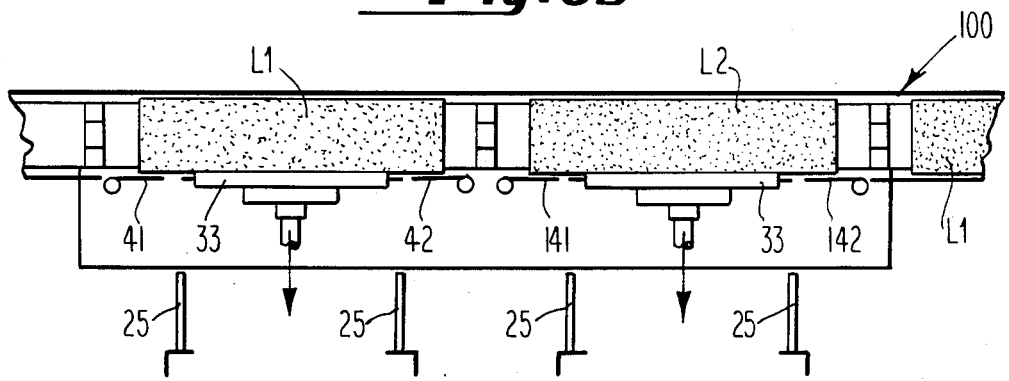

In FIG. 5C, the shutters 41, 42 and 141, 142 have been pivoted to their closed positions which enable the shutters to function as retainers to retain the lasagna stacks L1, L2 in the receiving sections R1, R2 of the bulk conveyor 100. In FIG. 5C, the cross push plates 33 are about to be withdrawn to their retracted positions, as indicated by the arrows. Until the narrow belt conveyor 100 moves forwardly the lasagna stacks L1, L2 are retained in the receiving sections R1, R2 of the bulk conveyor 100 by the closed shutters 41, 42, 141, 142.

Figure 5D:
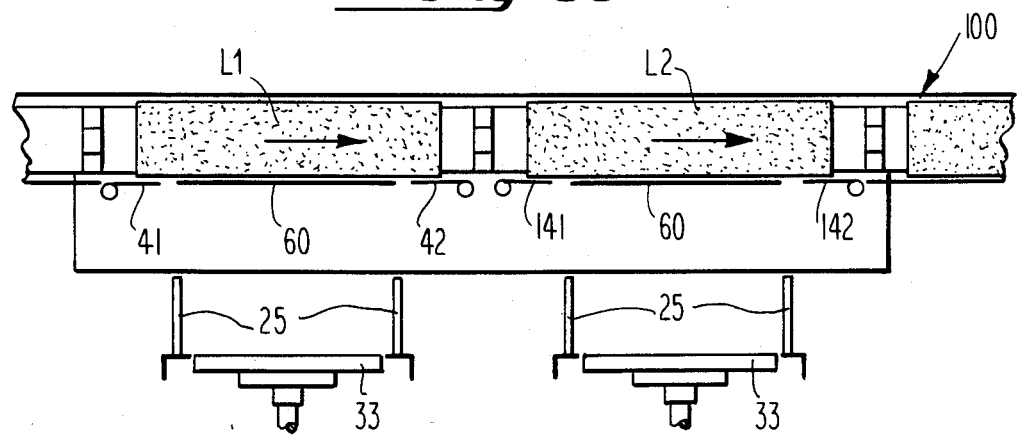

In FIG. 5D, the cross push plates 33 have been withdrawn, the gates 60 are in their UP or closed positions, the retaining shutters 41, 42, 141, 142 are in their closed positions, and the bulk conveyor 100 is about to be started to transport the stacks of lasagna L1, L2 to the packaging station.

The structural details of the collator will now be described.

Figure 1:
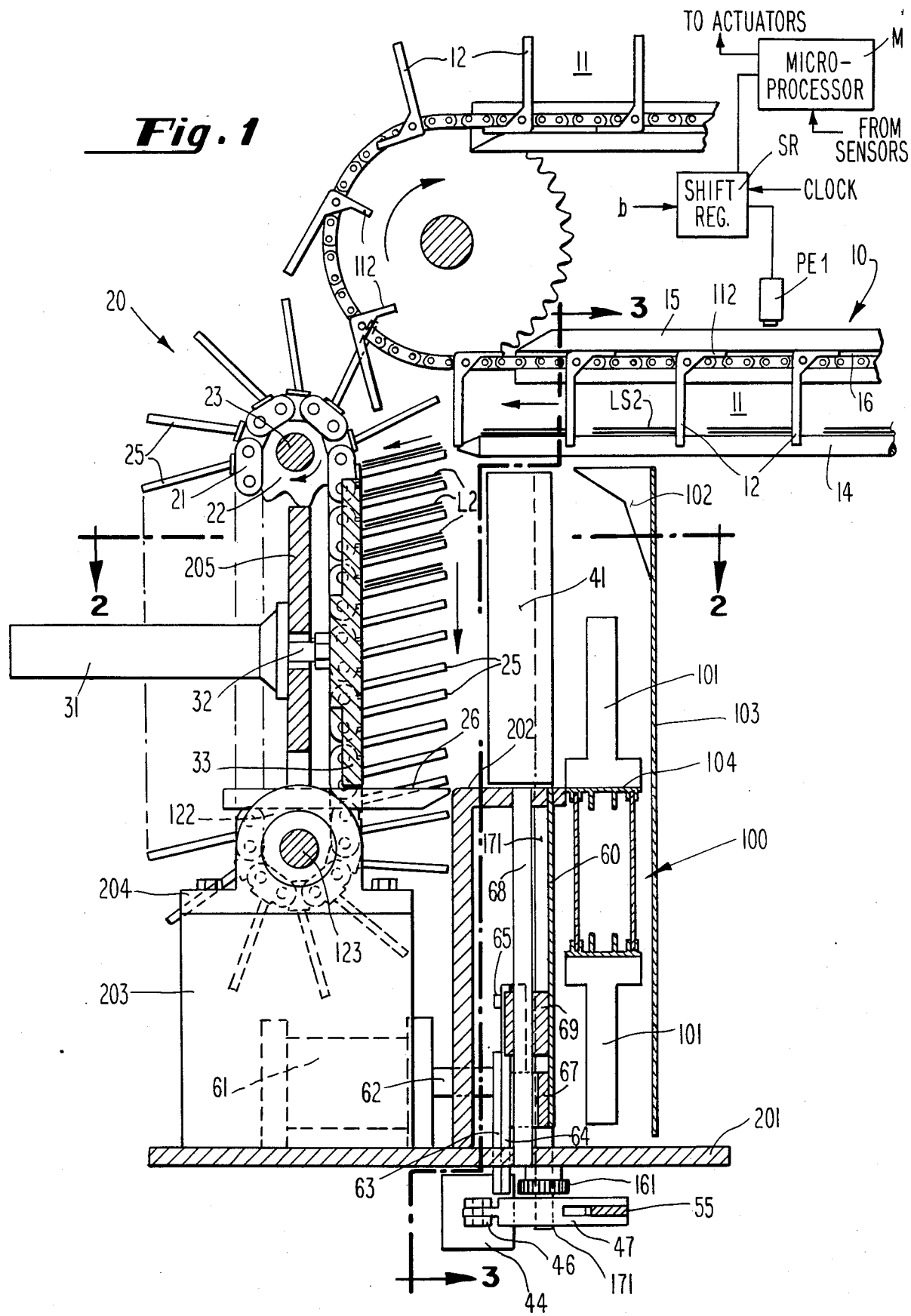
FIG. 1 is a side elevational view of the collator or stacking section of the automatic lasagna making and packer apparatus.

As illustrated in FIGS. 1–4, sets of lasagna strips LS1 and LS2 are transported by main conveyor 10 moving from right to left as viewed in FIG. 1. The lasagna strips are in pairs, one strip on top of the other. This results from the cutting of the U-shaped lasagna strips which are deposited in horizontal position on the conveyor by the stick feeders, as previously described. The main conveyor 10 is divided into flights 11 by consecutive pusher fingers 12. Each flight 11 of main conveyor 10, after receiving delivery of lasagna at the exit end of the dryer and after passing through the disc cutters, should contain two sets of paired lasagna strips LS1, LS2 side-by-side at spaced apart positions. Thus, each conveyor flight 11 delivers two sets LS1 and LS2 of paired lasagna strips into two side-by-side collator conveyors 20.

As seen in FIG. 1, each collator conveyor 20 comprises a vertically oriented endless chain 21 which carries spaced-apart shelf fingers 25 which receive and support the lasagna strips. Endless chain 21 is trained over upper and lower sprockets 22 and 122 which are rotated in an indexing fashion on shafts 23 and 123, respectively. As viewed in FIG. 1, the shelf fingers 25, when indexed, move downwardly on the right side and upwardly on the left side.

Two photo-electric sensors PE1, PE2, one positioned at each side of the conveyor 10 about three flights from the discharge end of the conveyor, sense the presence or absence of two layers of lasagna. The sensors PE1, PE2 cause data to be entered into a shift register counter SR. As each flight 11 of the main conveyor 10 passes under the photosensors PE1, PE2 data is entered into the shift register SR indicating the presence or absence of two layers of lasagna strips in that particular flight 11. If less than two layers is sensed, a reject door control is actuated to dispose of any single layer which may be present.

When a flight 11 reaches a collator index position, the data which has been entered into the shift register for that particular flight is examined. If the data indicates that two layers of lasagna are present in the flight, then the collator conveyor 20 is instructed to index one position.

Each collator index is counted by the shift register counter SR. When the count reaches 9, or 10, or 11, as determined by a manual panel switch, a sequence of machine motions is initiated which remove the lasagna from the shelf fingers of the collator conveyors 20. During the brief period of time that the lasagna is being removed from the collator conveyors 20, the collator indexing pauses briefly, but it resumes and continues as the stacks of lasagna are being indexed on the narrow track bulk conveyor 100.

A first step in the lasagna removal sequence causes the main conveyor 10 to stop and causes both cross push arms 33 to extend. This pushes the paired-strips of lasagna from the shelf fingers 25 and into the receiving sections R1, R2 of the narrow track bulk conveyor 100, as is illustrated in FIG. 5B. A deflector plate 102 having two inclined surfaces (FIG. 1) deflects the upper paired strips downwardly and assists in causing all of the lasagna strips to fall down into stacks of horizontally-oriented lasagna strips identified L1 and L2 in FIG. 5B. These stacks are positioned between the dividers 101 of the bulk conveyor 100.

When both cross push arms 33 are extended, as illustrated in FIG. 5B, the second step starts. This closes the retainer shutters 41, 42, 141, 142, and causes the cross push arms 33 to retract. This is illustrated in FIG. 5C.

When the above step is completed, the third step begins. This causes the main conveyor 10 to start up and causes the retainer gates 60 to lift to the UP position.

After the gates 60 move to the UP position, as illustrated in FIG. 5D, the fourth step begins. This causes the narrow belt bulk conveyor 100 to index twice to move the lasagna stacks L1, L2 two positions, thereby clearing the receiving sections R1, R2, and instructing the carton packaging equipment (not shown) to index twice.

Following the above steps, the retainer gates 60 are lowered to DOWN position and the retainer shutters 41, 42, 141, 142 are opened. This leaves the equipment in the "home" position illustrated in FIG. 5A, awaiting the beginning of the next cycle.

FIGS. 3 and 4 show the details of the drive mechanism for moving the four retainer shutters 41, 42, 141, 142 pivotally through 90-degrees from open or stack-receiving position to closed or stack-retaining positions, or vice versa. For each collator conveyor, a cylinder 44 actuates a piston 45 which is coupled by a yoke 46 to a link arm 47 which is supported for pivotal movement on shutter shaft 171 on which the shutter 141 is mounted. Also mounted on shutter shaft 171 is a gear 161 which is in engagement with a second gear 362 which is mounted on shutter shaft 72 on which shutter 42 is mounted. The outer end of link arm 47 is connected to a rod 55, the opposite ends of which are connected to link arms 48 and 49. Link arm 48 is mounted for pivotal motion on shutter shaft 71 on which shutter 41 is mounted. The other link arm 49 is mounted for pivotal motion on a stub shaft 272 on which is mounted a gear 262 which is in engagement with a gear 162 mounted on shutter shaft 172 on which shutter 142 is mounted. It will be seen from FIGS. 3 and 4, that when piston 45 of the cylinder 44 is extended, the link arms 47, 48, and 49 are moved in counter-clockwise directions. This moves the first and third shutters 41 and 141 counter-clockwise from open to closed positions, and moves the second and fourth shutters 42 and 142 clockwise from open to closed positions. When the piston 45 is retracted, the shutters 41, 42, 141, 142 are moved in the opposite directions from closed to open positions.

The mechanism which raises and lowers the retainer gates 60 will now be described.

Each of the gates 60 is driven by a rotary cylinder 61 (FIG. 1) which is driven rotationally through 180 degrees in one direction and then, after a pause, is driven rotationally through 180 degrees in the opposite direction. The output shaft 62 of rotary cylinder 61 is connected to one end of a short eccentric arm 63. This is best seen in FIG. 3. The other end of arm 63 is connected to one end of a long link arm 64. At the other end of the long link arm 64 is a pin 65 which connects arm 64 to a connecting member 67 which is connected to both of the gates 60. Thus, the reciprocating rotational motion of the shaft 62 of the rotary cylinder 61 is transmitted through eccentric arm 63, long arm 64, pin 65, and connecting member 67 to the retaining gates 60. In this manner, the two gates 60 are driven up and down in reciprocating manner. During this motion the gates 60 are guided by bushings 69 which ride up and down guide rods 68.

Figure 2:
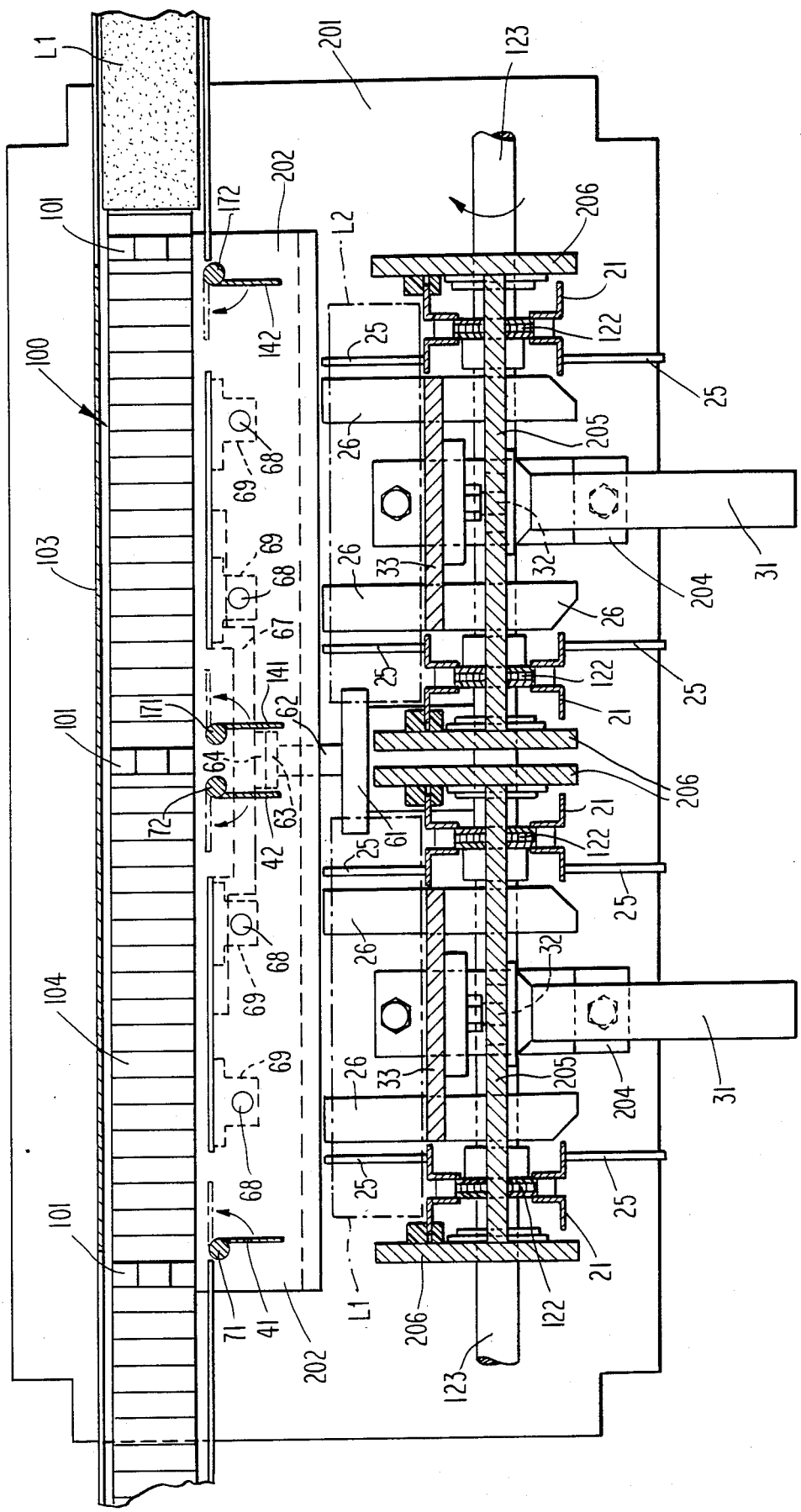
FIG. 2 is a view looking down along the line 2—2 of FIG. 1.

The frame members which support the collator will now be briefly described. The collator is supported on a horizontally-disposed base frame member 201 as seen in FIGS. 1, 2, and 3. Mounted on frame member 201 are pedestals 203 on which are mounted pillow blocks 204 which provide bearing support for an elongated shaft 123 on which the lower sprockets 122 are mounted for rotation.

Mounted on bearings on shaft 123, for pivotal movement thereon, are two I-frames in side-by-side relation, each I-frame comprising a pair of upright plates 206 and a cross-connecting plate 205. These I-plates are pivotal manually to expose the equipment therebeneath for examination, maintenance, and repair.

Also supported on base frame member 201 is a table having a shelf surface 202 which supports the lowermost lasagna strips as the strips are pushed from the shelf fingers 25 into the receiving sections R1 and R2 of the narrow belt bulk conveyor 100.

OPERATION

The entire lasagna packer, including the collator section, is controlled by a programmable microprocessor through which all signals are processed. All machine sensors and panel control switches are wired as inputs to the microprocessor. All machine actuators, such as motor, solenoids, and clutch-brake units, are wired as outputs from the microprocessor. The machine action occurs only as directed by the software of the microprocessor.

The machine sensors and their functions are listed below in Table I.

TABLE I
SENSOR CONTROL COMPONENTS FOR LASAGNA COLLATOR

| Sensor Designation | Type | Function |
| --- | --- | --- |
| TS 1 | Timing Switch | Machine Timing-Flipper control-open-close |
| TS 2 | Timing Switch | Machine Timing-Inspection Eye-Data Strobe |
| TS 3 | Timing Switch | Machine Timing-Reject Door Control-Open |
| TS 4 | Timing Switch | Machine Timing-Indexing Collator |
| PE 1 | Photo Eye | Lasagna Detection |
| PE 2 | Photo Eye | Lasagna Detection |
| PE 3 | Photo Eye | Collator Home Position |
| LS 1 | Proximity Switch | Cross Push #1 Home Position |
| LS 2 | Proximity Switch | Cross Push #2 Home Position |
| LS 3 | Proximity Switch | Cross Push #1 Extended |
| LS 4 | Proximity Switch | Cross Push #2 Extended |
| LS 5 | Proximity Switch | Gate Up |
| LS 6 | Proximity Switch | Gate Down |
| LS 7 | Proximity Switch | Shutters Open |
| LS 8 | Proximity Switch | Shutters Closed |
| LS 9 | Proximity Switch | Bulk Conveyor Home Position |
| LS 10 | Proximity Switch | Cartoner Home Position |
| SS 1 | Selector Switch | Lasagna Count Selection |

The machine actuators and their functions are listed below in Table II.

TABLE II
ACTUATOR CONTROL COMPONENTS FOR LASAGNA COLLATOR

| Actuator Designation | Type | Function |
| --- | --- | --- |
| Sol 1 | Solenoid | Flippers Down |
| Sol 2 | Solenoid | Flippers Up |
| CB 1 | Clutch-Brake Drive | Collator Drive |
| CB 2 | Clutch-Brake Drive | Bulk Conveyor Drive |
| CB 3 | Clutch-Brake Drive | Main Conveyor |
| Sol 3 | Solenoid | Cross Push #1 Out |
| Sol 4 | Solenoid | Cross Push #2 Out |
| Sol 5 | Solenoid | Cross Push #1 Return |
| Sol 6 | Solenoid | Cross Push #2 Return |
| Sol 7 | Solenoid | Shutters Open |
| Sol 8 | Solenoid | Shutters Close |
| Sol 9 | Solenoid | Gate Up |
| Sol 10 | Solenoid | Gate Down |
| CR 11 | Relay | Cartoner Index |

In the description which follows of the operation of the collator, the sensing and actuating components, many of which are not shown in the drawing, are identified by the designations used in Tables I and II above.

The operation of the collator will now be described. The main conveyor 10 transports a succession of sets of paired lasagna strips LS1 and LS2 in side-by-side spaced-apart relation toward the two side-by-side collator conveyors 20. The lasagna strips are transported in flights 11, pushed by the push fingers 12. The push fingers 12 are mounted on the conveyor for pivotal movement in the counter-clockwise direction but are prevented from moving pivotally in that direction by a stop shoulder 16 on a guide rail 15. For each flight, the presence or absence of paired lasagna strips is sensed by photo-electric eyes P1, P2 and data is fed to a shift register counter SR. An additional photo-electric eye PE3 senses when the collator conveyors 20 are in the "home" position and feeds a signal to terminal "b" of the shift register counter.

In the "home" position, the cross push plates 33 are in fully retracted position and the collator conveyors 20 are ready to receive delivery of additional sets of paired lasagna strips. When this condition is sensed by a photo-electric eye P3, a signal is given to the clutch-brake drive CB1 to start the main conveyor 10 and a signal is given to the shift register counter SR to start counting. As soon as the main conveyor 10 starts forward, one of the sets of push fingers 12 pushes a set of paired lasagna strips LS1, LS2 onto the shelf fingers 25 of the side-by-side collator conveyors 20. Each of the shelf fingers 25 is slightly inclined downwardly inwardly to ensure that the lasagna strips are retained. If the lower end of a push finger 12 is still in engagement with the rearward edge of a paired lasagna strip, the paired lasagna strips are sufficiently stiff to push the push finger 12 pivotally counter-clockwise, which the finger can now do since it has moved beyond the forward end of guide rail 15 and its shoulder 16. Each time a set of paired lasagna strips LS1, LS2 are delivered to the collator conveyors 20, the conveyors 20 are indexed one step. After a preselected number of steps, as for example, nine, ten, or eleven, as determined by the setting of the selector switch SS1, have been counted in the shift register counter SR, signals are given to the clutch-brake drives CB-3, CB-1, and CB-2 to stop the main conveyor 10, to stop the collating conveyors 20, and to stop the narrow belt bulk conveyor 100. Signals are then given to solenoids 3 and 4 to actuate the piston cylinders 31 to push the cross plates 33 forwardly, thereby, to push the side-by-side sets of paired lasagna strips off the shelf fingers 25 and into the receiving sections R1, R2 of the narrow belt bulk conveyor 100 which leads to the packaging section or cartoner.

When the side-by-side sets of paired lasagna strips are pushed off the shelf fingers 25, they become air-borne, and because they are light in weight the strips, particularly those from the uppermost shelf fingers tend to float upwardly. They also tend to assume an inclined position transversely relative to the horizontal. These undesirable effects are prevented by the deflector plate 102 which has two inclined surfaces which are designed to intercept the leading edges of the airborne lasagna strips and force them to fall downwardly horizontally to form stacks of lasagna strips L1, L2.

Timing switches, TS-1 thorough TS-4 are mounted on and driven by a timing shaft. These timing switches, which have the functions designated in Table I, generate signals which are sent to the microprocessor M.

When the push plates 33 reach their most extended position, this is sensed by proximity switches LS2 and LS3 and signals are generated and sent to solenoid 8 to actuate the piston cylinders 44 to close the retainer shutters 41, 42, 141, 142. Closing of the shutters is sensed by proximity switches which generate signals which are sent to solenoids 5 and 6 to actuate the piston cylinders 31 to retract the push plates 33. Signals are also sent to solenoid 9 to actuate the rotary cylinder 61 to lift and close the retainer gates 60. When the gates 60 are lifted to closed position, this is sensed by proximity switch LS5 and signals are generated and sent to clutch-brake 2 to start up the narrow belt bulk conveyor 100. Proximity switches LS1, LS2 sense when the push plates 33 have been fully retracted and signals are then generated and sent to clutch-brakes CB 3 and CB 1 to start up the main conveyor 10 and the collator conveyors 20. Proximity switches LS 10 sense when the narrow belt bulk conveyor 100 and cartoner have indexed two positions are generated and sent to solenoids 10 and 7 to lower the gates 60 and to open the pivotal retaining shutters 41, 42, 141, 142. The collator is now ready for another cycle. Proximity switches LS6 and LS7 sense that the retaining gates 60 are DOWN and that the retaining shutters are open and signals are generated and sent to inform the microprocessor that the collator conveyors are in condition for the push places 33 to be extended after the desired count has been registered in the shift register counter SR.

A summary of the foregoing description of the operation of the lasagna collator is given below in Table III.

TABLE III

CONTROL DESCRIPTION FOR
LASAGNA PACKER - COLLATOR SECTION

| Machine Logic Description | Sensor | Actuator |
|---|---|---|
| Detect material passing under photo eyes and enter data into shift register. | PE1, PE2 TS 4 | |
| As main conveyor flight reaches collator index position, examine shift register data and index collator. | TS 4 | CB 1 |
| Count collator index. When count reaches 9, 10, or 11 as determined by a panel switch - initiate the following sequence: | SS 1 | |
| Stop the Main Conveyor and extend Cross Push Arms | | CB 3 Sol 3, Sol 4 |
| When both Cross Push Arms are extended-Return both Cross Push Arms and close the shutters | LS 3, LS 4 | Sol 5, Sol 6 Sol 8 |
| When Cross Push Arms are returned and shutters are closed-Restart the Main Conveyor and move Gate UP | LS 1, LS 2 LS 8 | CB 3 Sol 9 |
| When Gate is UP - Index the Bulk Conveyor twice and index the cartoner twice. | LS 5 | CB 2 CR 11 |
| As the Cartoner is completing its second index, move the Gate down and | | Sol 10 Sol 7 |

TABLE III-continued

CONTROL DESCRIPTION FOR
LASAGNA PACKER - COLLATOR SECTION

| Machine Logic Description | Sensor | Actuator |
|---|---|---|
| open the shutters | | |

Control of the present lasagna packer may be accomplished by a programmable microprocessor, sometimes known as a programmable controller or programmable microcomputer, made by a number of different manufacturers. One suitable controller is the Allen-Bradley Programmable Controller, PLC 2/15, a machine control microcomputer with a 1000 word software control program.

I claim:
1. A collator for articles comprising:
  a. an endless collator conveyor positioned for vertical travel in the downward direction, said collator conveyor comprising a succession of pairs of shelf fingers spaced apart for receiving and supporting articles delivered thereto;
  b. a narrow belt bulk conveyor for transporting stacks of articles to a packaging station, said bulk conveyor having at least one receiving section, said bulk conveyor having a continuous rear wall and a front wall which is continuous except at said receiving section, said receiving section comprising:
    b-1. a pair of spaced apart retainer shutter means pivotally movable on vertical axes between open and closed positions, there being a space between the near edges of the shutter means of the pair when in closed position;
    b-2. a vertically movable gate means adapted to be lifted into position to substantially close the space between said shutter means; and front and rear walls, and said shutter means and gate means in their closed positions providing boundaries for stacks of articles on said narrow belt bulk conveyor, and
  c. cross push plate means for pushing articles off the shelf fingers of said collator conveyor and into said receiving section of said narrow belt bulk conveyor.
2. Apparatus according to claim 1 wherein an angular deflector plate is provided in said receiving section for deflecting the articles downwardly to form a stack.
3. Apparatus according to claim 1 wherein said shelf fingers are inclined downwardly inwardly to assist in retaining articles on the shelf fingers.
4. Apparatus according to claim 1 wherein said narrow belt bulk conveyor has a width corresponding to the width of the articles.
5. Apparatus according to claim 1 wherein said push plate means includes at least one push plate and means for moving said push plate, wherein a shelf register counter is provided for counting a pre-selected number of articles received by said collator conveyor and for triggering said push plate means into extended positions upon reaching said pre-selected number.
6. A collator for articles comprising:
  a. a pair of endless collator conveyors positioned for vertical travel in the downward direction, each of said collator conveyors comprising a succession of pairs of shelf fingers spaced apart for receiving and supporting paired articles delivered thereto;
  b. a narrow belt bulk conveyor for transporting stacks of articles successively to a packaging sta- tion, said bulk conveyor having two receiving sections, said bulk conveyor having a continuous rear wall and a front wall which is continuous except at said receiving sections, each of said receiving sections comprising b-1. a pair of spaced apart retainer shutter means pivotally movable on vertical axes between open and closed positions, there being a space between the near edges of the shutter means of the pair when in closed position;

b-2. a vertically movable gate means adapted to be lifted into position to substantially close the space between said shutter means; said front and rear walls, and said shutter means and gate means in their closed positions providing boundaries for stacks of articles on said narrow belt bulk conveyor, and c. a pair of cross push plate means for pushing articles off the shelf fingers of said pair of collator conveyors and into said receiving sections of said narrow belt bulk conveyor.

7. Apparatus according to claim 6 wherein an angular deflector plate is provided in each of said receiving sections for deflecting the articles downwardly to form a stack.

8. Apparatus according to claim 6 wherein said shelf fingers are inclined downwardly inwardly to assist in retaining articles on the shelf fingers.

9. Apparatus according to claim 6 wherein said narrow belt bulk conveyor has a width corresponding to the width of the articles.

10. Apparatus according to claim 6 wherein said push plate means includes at least one push plate and means for moving said push plate, wherein a shelf register counter is provided for counting a pre-selected number of articles received by said collator conveyors and for triggering said push plate means into extended positions upon reaching said pre-selected number.

11. A collator for articles comprising:

a. an endless collator conveyor positioned for vertical travel articles delivered thereto;

b. a narrow belt bulk conveyor for transporting stacks of articles to a packaging station, said bulk conveyor having a continuous rear wall and a front wall which includes a receiving section which comprises:

b-1. a pair of spaced apart retainer shutter means pivotally movable between open and closed positions, the near edges of the shutter means when in closed position being spaced apart;

b-2. a vertically movable retainer gate means adapted to be moved into position to substantially close the space between said shutter means when said shutter means are in closed position, said front and rear walls, and said shutter means and gate means in their closed positions providing boundaries for stacks of articles on said narrow belt bulk conveyor;

c. push plate means for pushing articles off the shelf fingers of said collator conveyor and into said receiving section of said narrow belt bulk conveyor;

d. wherein said pair of shutter means includes retainer shutters and means for moving said retainer shutters pivotally between open and closed positions;

e. wherein said gate means includes a retainer gate and means for moving said retainer gate between open and closed positions; and f. wherein said push plate means includes a push plate and means for moving said push plates to push articles off said collator conveyor shelves when said retainer shutters and said retainer gates are in open positions.

12. A collator for articles comprising:

a. an endless collator conveyor positioned for vertical travel, said collator conveyor comprising a succession of shelves for receiving and supporting articles delivered thereto;

b. a narrow belt bulk conveyor for transporting stacks of articles to a packaging station, said bulk conveyor having a front wall which has an opening for receiving stacks of articles;

c. retainer means positioned at said opening and movable between open and closed positions for retaining said stacks of articles on said narrower belt bulk conveyor when in closed positions, said front walls and said retainer means, when in the closed position, providing a boundary for articles on said narrow belt bulk conveyor;

d. push means for pushing articles off the shelves of said collator conveyor;

e. means for moving said push means forwardly to push articles off said collator conveyor shelves and into said opening of said bulk conveyor when said retainer means are in open positions; and f. means for withdrawing said push means from its forward position.

13. Apparatus according to claim 12 wherein said retainer means comprises:

a. first retainer means movable to closed positions when said push means is in forward position for retaining opposite ends of said articles on said narrow belt bulk conveyor; and b. second retainer means movable to closed position after said push means has been withdrawn from its forwardmost position.

14. Apparatus according to claim 13 wherein said first retainer means are movable pivotally between open and closed positions.

15. Apparatus according to claim 14 wherein said second retainer means is moved linearly between open and closed positions.

16. The apparatus of any of claims 1–15, wherein the collator is for use as a section of a lasagna packaging apparatus, which apparatus is of a type having a main conveyor for transporting lasagna strips in transverse orientation successively toward a discharge end, wherein the articles that the collator is adapted to transport are lasagna strips, and wherein the collator conveyor is disposed for receiving lasagna strips delivered from a discharge end of the main conveyor.

* * * * *

UNITED STATES PATENT OFFICE
CERTIFICATE OF CORRECTION

Patent No. 4,618,055     Dated October 21, 1986

Inventor(s) Michele L. Porcelli

It is certified that error appears in the above-identified patent and that said Letters Patent are hereby corrected as shown below:

Column 1, line 15, "lasagne" should be "lasagna".

Column 8, line 36, after the word "means;" and before the word "front", the word "and" should be "said".

Column 10, line 26, the word "narrower" should be "narrow".

Signed and Sealed this

Thirty-first Day of March, 1987

Attest:

DONALD J. QUIGG

Attesting Officer     Commissioner of Patents and Trademarks